April 12, 1955     H. C. RHODES     2,706,043
DOUGH MOLDING CONTROL
Filed July 1, 1953
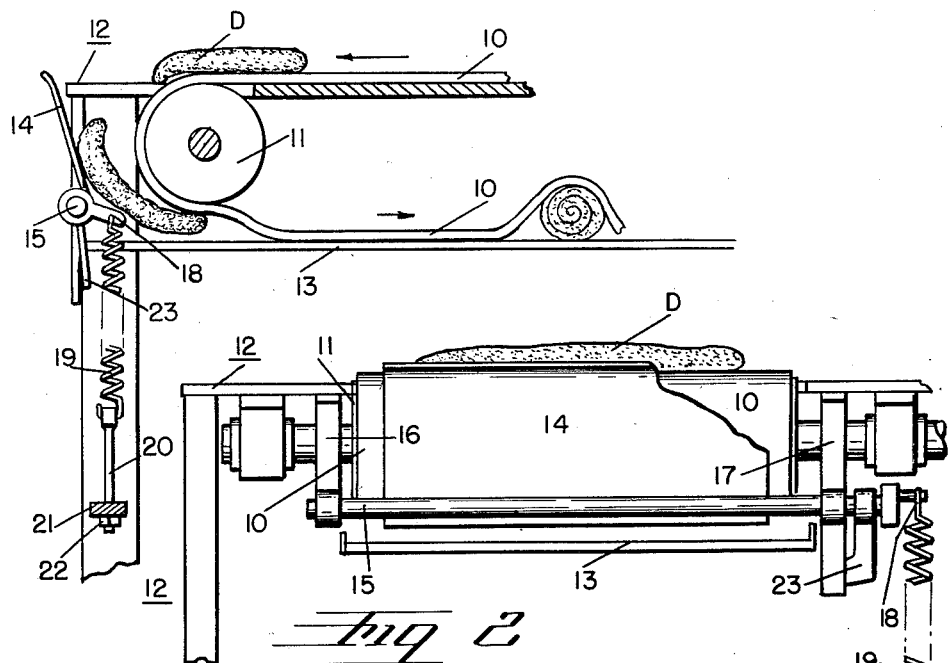
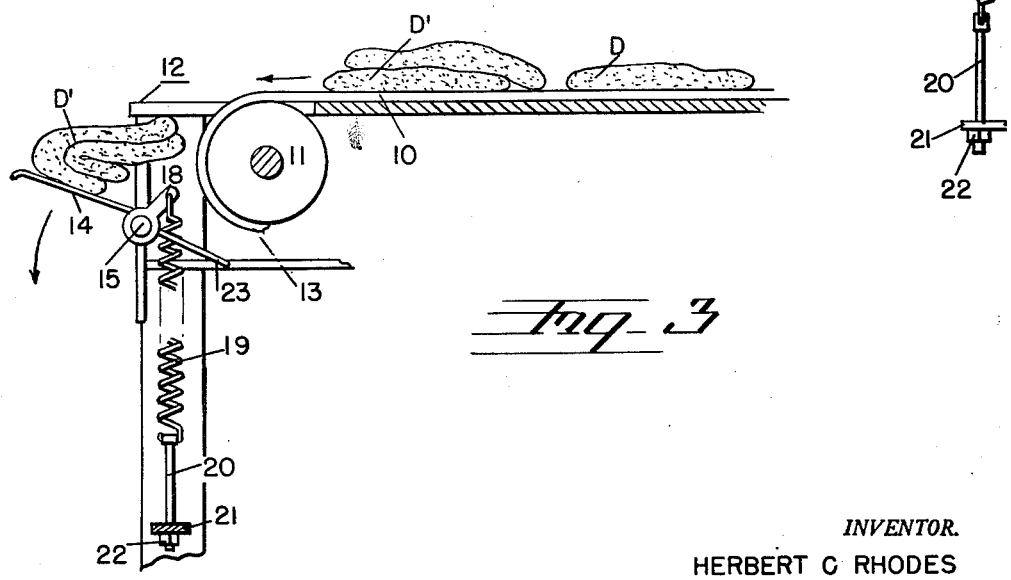
INVENTOR.
HERBERT C RHODES
BY
*Otto Moeller*
ATTORNEY

2,706,043

DOUGH MOLDING CONTROL

Herbert C. Rhodes, Portland, Oreg., assignor to Read Standard Corporation, a corporation of Delaware Application July 1, 1953, Serial No. 365,391

2 Claims. (Cl. 209—121)

This invention relates to the preparation of dough for delivery into baking pans and, more specifically, is related to the forming of the individual pieces of dough, as received from the dough mixing and dough molding machines, into predetermined individually sized and shaped pieces for deposit in the baking pans.

Occasionally it happens that an extra large piece of dough may be delivered from the dough molding machine, or more likely, that two pieces of dough may be inadvertently delivered together from the dough machine and thus combined into a double-sized piece. If such an oversize or double size piece of dough is not caught before it is deposited in the baking pan and delivered to the baking oven, the oversize piece may spill over from the pan into the over as the dough rises, or may cause other difficulty, and, in any event the oversize dough is completely lost and wasted.

An object of the present invention is to provide simple and practical means for preventing such an oversize or double piece of dough from continuing on its course to the baking pans, and to enable such oversize dough pieces to be recovered and saved for subsequent return to the dough machine.

In the accompanying drawings:

Fig. 1 is a fragmentary sectional elevation showing my control in position on a dough-shaping and conveying means, the control being in normal position for the travel of the dough pieces of the desired size;

Fig. 2 is an end elevation taken from the left of Fig. 1; and

Fig. 3 is a fragmentary sectional elevation similar to Fig. 1 but illustrating the operation of my control when double sized dough pieces are delivered.

Referring first to Fig. 1, an endless traveling belt 10 receives the pieces of dough D from the dough-molding machine (not shown). This belt 10 passes around an end roller 11, mounted in the supporting frame which is indicated in general by the reference character 12, and the belt then travels along over a bottom platform 13. The bottom platform 13 is spaced below the top deck of the supporting frame and constitutes a pathway for the dough pieces which are then moved along (from left to right as viewed in Fig. 1) by the action of the endless traveling belt 10 until the dough pieces reach the opposite end of the platform 13 and are dropped consecutively into baking pans (not shown) which are positioned beneath the discharging end of the platform 13.

As the pieces of dough D drop down on to the platform 13, with the passage of the belt around the roller 11, the dough pieces are then engaged by the belt 10 on the platform 13 and are rolled up and rolled along as a result of the action of the belt. In this way the dough is formed into the desired rolled-up shaped pieces for deposit into the baking pans as the dough is moved to the discharging end of the platform by the travel of the belt.

A guide plate 14 is secured to a hinge shaft 15 which is mounted in suitable bearings on a pair of brackets 16 and 17 (Fig. 2) attached to the frame 12, and this guide plate is positioned a short distance beyond the end of the roller 11 for the belt 10, as shown in Fig. 1. When the pieces of dough D, carried from the dough-molding machine on the upper course of the rapidly moving belt 10, arrive above the end roller 11, they are thrown against the guide plate 14, and if the pieces are of normall size, the plate 14 will cause these pieces to drop down on to the platform 13 where they again become engaged by the belt 10, as previously mentioned.

An arm 18 is secured to the shaft 15 of the guide plate 14 and a spring 19 has its upper end attached to this arm 18 and its lower end attached to a rod 20. The rod 20 extends down through an aperture in the stationary bracket 21 which is attached to the frame 12. The rod 20 is threaded and an adjusting nut 22 is mounted on the end of the rod 20 below the bracket 21 and provides means for adjusting the tension of the spring 19.

As apparent from Fig. 1, the spring 19 holds the guide plate 14 normally in the upright position as illustrated in Fig. 1, the clockwise swing of the plate 14 under the pull of the spring 19 being restricted by an L-shaped limit arm 23 (see also Fig. 2) which engages a lower extension of the bracket 17 when the plate 14 is in its extreme upright position.

The tension of the spring 19 is so adjusted that when a regular size piece of dough D is thrown against the guide plate 14 only slight counterclockwise movement of the guide plate will result and the guide plate will then immediately resume its upright position and cause the engaging piece of dough to pass on down on to the platform 13 as desired. However, when a much heavier piece of dough, thus a double piece of dough D', as illustrated in Fig. 3, is impinged against the guide plate 14 by the rapid travel of the belt around the end roller 11, this heavier piece of dough will overbalance the pull of the adjusted spring 19 and thus cause the plate 14 to continue to swing outwardly and rotate in a counterclockwise direction until the rotation of the plate is sufficient to cause the heavy or double piece of dough to slide outwardly off from the plate 14. When this occurs the plate 14 will immediately swing back to its upright position to the limit permitted by the limit arm 23.

By providing a suitable receptacle in front of the frame 12 below the swinging plate 14 such oversize or double pieces of dough which are discharged in this manner by the plate 14 are collected and can then be returned to the dough machine for reuse.

Thus the travel of such oversize and double pieces of dough is automatically prevented and these oversized rejected pieces of dough, instead of being entirely wasted, can be saved for future use.

I claim:

1. In a device for controlling the delivery of individual pieces of dough from a dough molding machine to the baking pans, an endless belt conveying pieces of dough from the dough molding machine, said belt passing around an end roller, a dough guide plate spaced a short distance beyond said roller and normally disposed in an upright position transversely with respect to the direction of travel of said endless belt and extending above and below the plane of the upper course of said endless belt to provide a passageway between said plate and said roller, whereby to normally direct through said passageway pieces of dough arriving at the end of the upper course of said belt and being impinged against said plate, a transverse hinge mounting for said plate adjacent the lower end thereof adapted to enable said plate to swing outwardly away from said roller and belt when impacted by a traveling dough piece, spring means connected with said plate exerting a force opposing the outward swing of said plate, and means for adjusting said spring, whereby, when pieces of dough of predetermined size or weight are impinged against said plate, such pieces will be guided in their course to the baking pans by said plate through said passageway while heavier pieces, upon contact with said plate, will cause said plate to swing far enough against the force of said spring means to cause said heavier pieces to be discharged away from said belt and said passageway.

2. A device for controlling the delivery of individual pieces of dough from a dough molding machine to the baking pans including an endless belt, said belt passing around an end roller with the upper and lower courses of said belt leading to and away from said roller respectively, a lower supporting guideway for the moving dough pieces below said lower course of said belt, a guide plate spaced a short distance beyond said roller and belt and normally disposed in an upright position transversely with respect to the direction of travel of said endless belt and extending above and below the plane of the upper course of said endless belt to provide a passageway between said plate and said roller and belt, whereby to normally direct through said passageway pieces of dough, when arriving at the end of said upper course of said belt and being impinged against said plate, down on to said lower guideway, a transverse hinge mounting for said plate adjacent the lower end thereof adapted to enable said plate to swing outwardly away from said roller and belt when impacted by a traveling dough piece, and spring means connected with said plate exerting a force opposing the outward swing of said plate whereby, when pieces of dough of predetermined size or weight are impinged against said plate, such pieces will be guided down by said plate through said passageway on to said lower guideway while heavier pieces, upon contact with said plate, will cause said plate to swing far enough against the force of said spring means to cause said heavier pieces to be discharged away from said belt, passageway and lower guideway.

References Cited in the file of this patent
UNITED STATES PATENTS

| | | |
|---|---|---|
| 1,715,968 | Weber et al. | June 4, 1929 |
| 2,399,894 | Schulz | May 7, 1946 |
| 2,611,484 | Sawyer et al. | Sept. 23, 1952 |